United States Patent Office 3,562,255
Patented Feb. 9, 1971

3,562,255
17-PROPARGYLAMINES OF STEROIDAL DITHIOKETALS
Donald W. Oliver, King of Prussia, and Gerhard R. Wendt, Havertown, Pa., assignors to American Home Products Corporation, New York, N.Y., a corporation of Delaware
No Drawing. Filed Apr. 29, 1969, Ser. No. 820,335
Int. Cl. C07c 173/00
U.S. Cl. 260—239.5      23 Claims

ABSTRACT OF THE DISCLOSURE 13-alkyl-17α-aminopropargyl-17-hydroxygon - 4 - en-3-one, cyclic ethylene thioketals and alkanoates, optionally halo-substituted at C-4, (I) and their salts are useful biocidally as trichomonacides and amebicides, and pharmacologically as bronchodilators. Compounds (I) are prepared by treating the corresponding 13-alkyl-17α-ethynyl-17-hydroxygon-4-en-3-one, cyclic ethylene thioketal (II) with formaldehyde and an appropriately-substituted secondary amine.

---

This invention is concerned with new 17α-aminoalkynyl steroidal dithioketals. The compounds of this invention are biocidally-active, especially against pathogenic amebae and trichomonads; and they exhibit bronchiodilating activity in standard pharmacological tests when administered to warm blooded laboratory animals.

DESCRIPTION OF THE INVENTION

This invention contemplates compounds of Formula I:

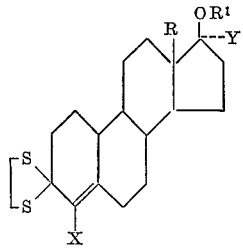

wherein:

R is alkyl of from 1 to 5 carbon atoms;
$R^1$ is hydrogen or alkanoyl of from 2 to 5 carbon atoms;
X is hydrogen or halo; and
Y is

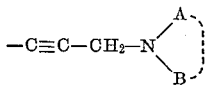

wherein A and B, independently, are alkyl of from 1 to 5 carbon atoms, monophenyl-substituted alkyl of from 1 to 5 carbon atoms or, taken together, from a divalent radical selected from

—C(R$^3$)$_2$(CH$_2$)$_m$C(R$^3$)$_2$—

$R^3$ being hydrogen or methyl and m a whole number of from 2 to 6.

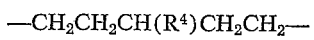
—CH$_2$CH$_2$CH(R$^4$)CH$_2$CH$_2$—

$R^4$ being hydroxy, carboxy or monophenyl-substituted alkyl of from 1 to 5 carbon atoms,

—CH$_2$CH$_2$N(R$^5$)CH$_2$CH$_2$—

$R^5$ being selected from alkyl of from 1 to 5 carbon atoms or monohydroxy-substituted alkyl of from 1 to 5 carbon atoms,

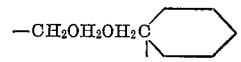

or

—CH$_2$CH$_2$OCH$_2$CH$_2$— and non-toxic, acid-addition salts thereof.

Preferred compounds comprise a subgeneric family of Formula I wherein R is methyl or ethyl, $R^1$ is hydrogen, X is hydrogen or chloro and Y is

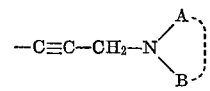

wherein

is

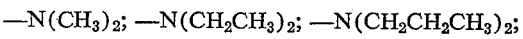
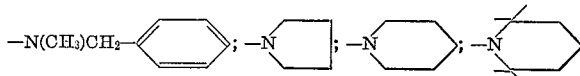
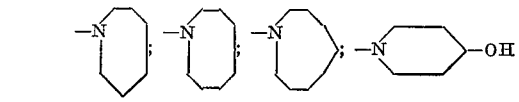
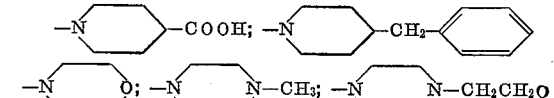
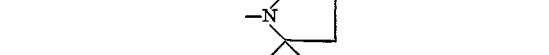

or

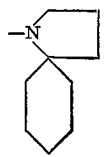

Special mention is made of a number of particularly valuable embodiments of this invention. These are:

17α-(3-dimethylamino-1-propynyl)-13-ethyl-17-hydroxygon-4-en-3-one, cyclic ethylene thioketal and its hydrochloride; monohydrate;
17α-(3-diethylamino-1-propynyl)-13-ethyl-17-hydroxygon-4-en-3-one, cyclic ethylene thioketal and its 1-enantiomorph and their hydrochlorides;
17α-(3-dipropylamino-1-propynyl)-13-ethyl-17-hydroxygon-4-en-one, cyclic ethylene thioketal;
17α-(3-dibutylamino-1-propynyl)-13-ethyl-17-hydroxygon-4-en-3-one, cyclic ethylene thioketal and its hydrochloride;
17α-(3-morpholino-1-propynyl)-13-ethyl-17-hydroxygon-4-en-3-one, cyclic ethylene thioketal and its hydrochloride, monohydrate;
13-ethyl-17β-hydroxy-17-(3-piperidino-1-propynyl)gon-4-en-3-one, cyclic ethylene thioketal and its hydrochloride;
4-chloro-17α-(3-dimethylamino-1-propynyl)-13-ethyl-17-hydroxygon-4-en-3-one, cyclic ethylene thioketal and its hydrochloride;
4-chloro-17α-(3-diethylamino-1-propynyl)-13-ethyl-17-hydroxygon-4-en-3-one, cyclic ethylene thioketal and its hydrochloride;
4-chloro-17α-((3-(4-methyl-1-piperazinyl)-1-propynyl))-13-ethyl-17-hydroxygon-4-en-3-one, cyclic ethylene thioketal and its dihydrochloride; and 1-[3-(13-ethyl-17β-hydroxy-3-oxogon-4-en-17-yl)-2-propynyl]-isonipecotic acid, cyclic ethylene thioketal and its hydrochloride.

When used herein and in the appended claims, the term "alkyl of from 1 to 5 carbon atoms" contemplates lower hydrocarbon radicals, straight chain and branched, including, for example, methyl, ethyl, propyl, butyl and pentyl radicals. The term "alkonoyl of from 2 to 5 carbon atoms" contemplates lower alkonoyl radicals such as acetyl, propionyl, butyryl and valeryl. The term "non-toxic, acid-addition salts" contemplates salts of the basic compounds of Formula I. These salts can be used to isolate the compounds and, in addition, are just as useful biocidally and pharmacologically as the free bases and in many instances, because of improved solubility characteristics, they lend themselves advantageously to the formulation of a broader range of biocidal or pharmacological compositions. Illustrative of the salt-forming acids contemplated are inorganic acids such as hydrochloric, sulfuric, nitric, phosphoric and the like; and organic acids, such as acetic, malic, citric, aconitic, pamoic and the like.

The 17-aminoalkynyl steroidal dithioketals of Formula I are prepared by treating an appropriately substituted 17-ethynyl steroidal dithioketal of Formula II with formaldehyde and an appropriately substituted amine:

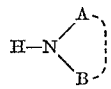

wherein A and B are as above defined, under Mannich condensation conditions, according to the following sequence:

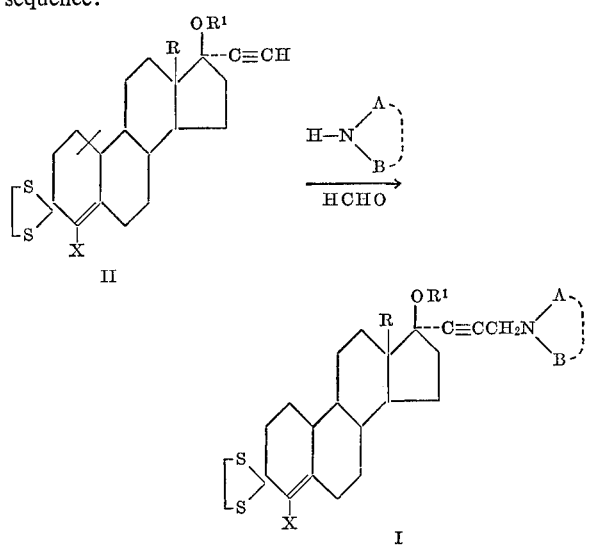

wherein R, R¹, X, A and B are as above defined.

The process is carried out under conditions which are not particularly critical. Those skilled in the art will immediately recognize that it is a type of Mannich reaction. In general, the acetylenic steroid II is suspended in an inert solvent, such as dioxane, and is treated with aqueous formaldehyde and the appropriate amine, preferably in the form of an addition salt with an organic acid, such as acetic acid, or an inorganic acid, such as hydrochloric acid. A very small amount of a metal salt catalyst, preferably cuprous chloride, can be added to improve the yield. The reaction is conducted at a temperature of from about 25° C. to about 100° C. and preferably at about 55–75° C. for a period of time long enough to effect the reaction; 20–40 hours at 55–75° C., for example, provides good yield in most cases. The product is recovered in any convenient manner. One means is to pour the mixture into ice and water, render the suspension basic (as with dilute aqueous sodium hydroxide) and extract the basic product with ether. Evaporating the ether leaves the product as a residue. Alternatively, addition of an acid to the ether solution causes precipitation of the product as an acid addition salt.

Starting materials of Formula II for preparation of the compounds of this invention are available or can be prepared by techniques available to those skilled in the art. One means comprises treating the corresponding 13-alkyl-17α-ethynyl-17-hydroxygon-4-en-3-ones of H. Smith, Hughes, Douglas, Wendt, Buzby, Jr., Edgren, Fisher, Foell, Gadzby, Hartley, Herbst, Jansen, Ledig, McLaughlin, McMenamin, Pattison, Phillips, Rees, Siddal, Suida, L. Smith, Tokolics and Watson, J. Chem. Soc., 1964, 4472–4492 in methanol solution with at least an equivalent amount of ethanedithiol in the presence of a ketalization catalyst, e.g., boron fluoride etherate. Stirring at 25° C. for about 30 minutes is sufficient to complete the reaction. Cooling and, if necessary concentrating, the reaction mixture causes the precipitation of Compound II. An exemplary, general procedure will be disclosed in the preferred embodiments hereinafter.

The compounds of Formula I and their salts of this invention have been found to possess biocidal properties, mainly in that they are inimical in very small amounts of the order of 7.8–1000 μg./ml. in aqueous media to the growth of ameba, protazoa (trichomonads) and the like. The instant compounds are thus useful in biocidal compositions in a variety of important fields of use. For example, they can be formulated and used in amebicidally- and trichomonacidally-active industrial cleaning compositions, and in soaps and detergents intended for veterinary use and in biocidally-active wash solutions to decontaminate premises, pastures, animal cages and the like, which have been infected with microorganisms, particularly of the type mentioned. They will be applied according to end use as powders, solutions, suspensions and the like, containing the active substance generally in concentrations of 0.1% to 0.7% by weight, or even as much as 1%, 1.5%, 1.8%, 2% and up to about 5%. In washing solutions for pastures and barns, the active compounds of this invention will be used generally in the range of from about 0.02% to 0.25% by weight.

Although, in common with most organic substances with relatively high molecular weights, compounds of Formula I have limited solubility in water, those skilled in the art will have no great difficulty in formulating them into a wide variety of biocidally-active compositions. In general, standard techniques can be employed and, where necessary, advantage is taken of the ability of compounds of Formula I to form salts, such as acid-addition salts which have enhanced solubility in water. The active compounds per se can be made up in dilute aqueous solution. They can, in addition, where required be made up into more concentrated formulations with solvents such as N,N-dimethylacetamide or ethylene glycol dimethyl ether and the like. They can also be formulated as suspensions or solutions in an aqueous vehicle containing an organic co-solvent, such as for example N,N-dimethylacetamide. Also, aqueous vehicles containing emulsifying agents, such as sodium lauryl sulfate, and relatively high concentrations, e.g., up to about 5% by weight, of the compounds of Formula I can be formulated by conventional techniques.

As is mentioned above, the instant compounds of Formula I in standard pharmacological tests have bronchodilating activity. More particularly, when administered intraperitoneally to guinea pigs, compounds of Formula I and their salts are found to protect the animals against respiratory difficulties (bronchoconstriction) induced by a histamine mist. The instant compounds, therefore, are deemed to possess utility in experimental and comparative pharmacology and are of value to treat conditions in animals, such as valuable domestic animals, and in laboratory animals, such as mice, rats, guinea pigs and the like, responsive to treatment with bronchodilators, such as the need to relieve bronchial spasm.

When used for these pharmacologically important purposes, the compounds of Formula I and their salts of this invention may be administered either alone or in combination with other pharmacologically-active ingredients. Whether singly or in combination, they may be used in the form of solid compositions for oral administration combined, if desired, with extenders or carriers which are relatively non-toxic and inert. They may be put into tablet, capsule or powder form. They may be mixed with animal foodstuffs. On the other hand, they may be administered in liquid form as a suspension or solution in a vehicle for parenteral use. By way of illustration pharmacological action as bronchodilators in guinea pigs has been demonstrated when compounds of this invention have been administered at a dosage of 50 mg./kg., i.p.

In the product of a total synthesis which has not included a suitable resolution stage the compounds prepared by the invention will be present as racemates. Using a convention approved by Fieser and Fieser, "Steroids" p. 336 (1959), compounds designated as the $d$-forms would be the enantiomers corresponding in configuration to that of the natural hormone estrone. The corresponding enantiomorphs would consequently be designated the $l$-forms and the racemates the $dl$-forms. Racemates will be depicted by structural formulas which show only the enantiomorphs of the $d$-configuration.

DESCRIPTION OF THE PREFERRED EMBODIMENTS

The following examples show the preparation of a number of compounds within the scope of the invention. They are merely illustrative and are not to be construed to limit the scope of the claims in any manner whatsoever.

EXAMPLE 1

$dl$-17α-(3-dimethylamino-1-propynyl) - 13 - ethyl - 17-hydroxygon - 4 - en - 3 - one, cyclic ethylene thioketal and hydrochloride hydrate To a solution of 1.5 g. of $dl$-13-ethyl-17α-ethynyl-17-hydroxygon-4-en-3-one, cyclic ethylene thioketal in 14 ml. of dioxane is added 1.0 ml. water, 0.5 ml. of 40% formalin solution, 1.0 ml. glacial acetic acid, 0.32 ml. of dimethylamine, and 30 mg. of cuprous chloride. The mixture is stirred under nitrogen for 24 hours then poured into ice water, basified with 10% sodium hydroxide solution and extracted with ether. The combined ether extracts are washed with water, saturated brine solution, and dried (MgSO$_4$). The ether layer (containing dissolved free base) is filtered and acidified with isopropanolic HCl solution to give 1.3 g. of a white product, M.P. 227–239° C. Recrystallization from methanol affords 0.38 g. of product M.P. 237–240° C., $\lambda_{max}^{KBr}$ 3.05, 3.47, 3.92, 6.12μ

*Analysis.*—Found (percent): C, 62.96; H, 8.15; N, 2.89; Cl, 7.22; S, 13.06; H$_2$O, 3.89. C$_{26}$H$_{39}$ONS$_2$·HCl·H$_2$O requires (percent): C, 62.39; H, 8.46; N, 2.80; Cl, 7.08; S, 12.81; H$_2$O, 3.59.

EXAMPLE 2

$dl$ - 17α-(3-diethylamino-1-propynyl)-13-ethyl-17-hydroxygon-4-en-3-one, cyclic ethylene thioketal and hydrochloride To a solution of 1.5 g. of $dl$-13-ethyl-17α-ethynyl-17-hydroxygon-4-en-3-one, cyclic ethylene thioketal in 14 ml. of dioxane is added 1.0 ml. of water, 0.5 ml. of 40% formalin solution, 1.0 ml. of acetic acid, 0.29 g. of diethylamine, and 30 mg. of cuprous chloride. The mixture is stirred under nitrogen at 60° C. for 24 hours. The reaction mixture is then poured into ice water, basified with 10% sodium hydroxide solution, and extracted with ether. The combined ether extracts are washed with water, saturated brine solution, and dried (MgSO$_4$). The ether layer (containing dissolved free base) is filtered and acidified with isopropanolic-HCl solution to give 1.32 g. of a white product which on recrystallization from methanol-ether gives 1.0 g. of product, M.P. 266–269° C., $\lambda_{max}^{KBr}$ 3.16, 3.47, 4.12, 6.10, 6.72mμ

*Analysis.*—Found (percent): C, 65.67; H, 8.40; N, 3.02; S, 12.48; Cl, 6.77. C$_{28}$H$_{43}$ONS$_2$·HCl requires (percent): C, 65.91; H, 8.69; N, 2.75; S, 12.57; Cl, 6.95.

EXAMPLE 3

$dl$-17α-(3 - dipropylamino - 1 - propynyl)-13-ethyl-17-hydroxygon-4-en-3-one, cyclic ethylene thioketal To a solution of 6.0 g. of $dl$-13-ethyl-17α-ethynyl-17-hydroxygon-4-en-3-one, cyclic ethylene thioketal, in 56 ml. of dioxane is added 4.0 ml. of water, 2.0 ml. of 40% formalin solution, 4.0 ml. of acetic acid, 2.2 ml. of dipropylamine, and 120 mg. of cuprous chloride. The mixture is stirred at 60° C. under nitrogen for 24 hours. The reaction mixture is then poured into ice water and basified with 10% KOH solution. The resulting precipitate is filtered off and washed with water. The crude product is dissolved in tetrahydrofuran-ether and treated with charcoal. The charcoal treated suspension was filtered through filter aid, and the filtrate is evaporated to approximately 50 ml. Crystals begin to form on cooling. After standing for 48 hours at room temperature and then cooling to 10° C., the crystalline product is collected to obtain 4.2 g. of product, M.P. 178–181° C., $\lambda_{max}^{KBr}$ 3.30, 3.48, 6.12, 6.85, 6.92, 7.00μ

*Analysis.*—Found (percent): C, 71.74; H, 9.57; N, 2.69; S, 12.93. C$_{30}$H$_{47}$ONS$_2$ requires (percent): C, 71.80; H, 9.44; N, 2.79; S, 12.78.

EXAMPLE 4

$dl$-17α-(3-dibutylamino - 1 - propynyl) - 13 - ethyl-17-hydroxygon-4-en-3-one, cyclic ethylene thioketal and hydrochloride To a solution of 3.0 g. of $dl$-ethyl-17α-ethynyl-17-hydroxygon-4-en-3-one, cyclic ethylene thioketal in 28 ml. of dioxane is added 2.0 ml. of glacial acetic acid, 2.0 ml. of water, 1.0 ml. of 40% formalin, 1.34 ml. of di-n-butylamine, and 60 mg. of cuprous chloride. The mixture is stirred at 60° C. under nitrogen for 24 hours. The reaction mixture is then poured into ice water and basified with 10% KOH solution. The precipitate is extracted with ether, and the ether extracts washed with brine and dried (MgSO$_4$). The clear ether solution of the free base is acidified with isopropanolic HCl. The resulting precipitate is collected and crystallized from methanol-ether. The crystals are filtered and dried over P$_2$O$_5$ to obtain 2.8 g. of product, M.P. 258–260° C., $\lambda_{max}^{KBr}$ 3.13, 3.43, 4.00, 6.90μ

*Analysis.*—Found (percent): C, 67.71; H, 8.97; N, 2.25; S, 11.33; Cl, 6.29. C$_{32}$H$_{51}$NOS$_2$·HCl requires (percent): C, 67.86; H, 9.26; N, 2.47; S, 11.32; Cl, 6.26.

EXAMPLE 5

$dl$ - 17α - (3 - morpholino - 1 - propynyl - 13 - ethyl - 17-hydroxygon - 4 - en - 3 - one, cyclic ethylene thioketal and hydrochloride, hydrate To a solution of 1.5 g. of $dl$-13-ethyl-17α-ethynyl-17-hydroxygon-4-en-3-one, cyclic ethylene thioketal in 14 ml. of dioxane is added 1.0 ml. of water, 0.5 ml. of 40% formalin solution, 1.0 ml. of acetic acid, 0.36 ml. of morpholine, and 30 mg. of cuprous chloride. The mixture is stirred under nitrogen for 24 hours at 60° C. The reaction mixture is then poured into ice-water, basified with 10% sodium hydroxide solution, and extracted with ether. The combined ether extracts are washed with water, saturated brine solution, and dried (MgSO$_4$). The ether layer (containing free base) is filtered and acidified with isopropanolic·HCl solution to give 1.6 g. of product, M.P. 249–254° C., $\lambda_{max}^{KBr}$: 3.06, 3.47, 3.95, 6.10, 6.92$\mu$ Analysis.—Found (percent): C, 62.20; H, 8.14; N, 2.60; S, 12.60; Cl, 7.00; H$_2$O, 3.05. C$_{28}$H$_{41}$O$_2$NS$_2$·HCl·H$_2$O requires (percent): C, 62.01; H, 8.12; N, 2.58; S, 11.83; Cl, 6.54; H$_2$O, 3.32.

EXAMPLE 6 dl - 13 - ethyl - 17β - hydroxy - 17 - (3 - piperidino - 1 - propynyl)gon-4-en-3-one, cyclic ethylene thioketal and hydrochloride To a solution of 6.0 g. of dl-13-ethyl-17α-ethynyl-17-hydroxygon-4-en-3-one, cyclic ethylene thioketal in 56 ml. of dioxane is added 4 ml. water, 2 ml. of 40% formalin solution, 4 ml. of glacial acetic acid, 1.6 ml. of piperidine and 120 mg. of cuprous chloride. The mixture is stirred under nitrogen for 24 hours at 60° C. The reaction mixture is then poured into ice-water and basified with 10% potassium hydroxide. The resulting precipitate is extracted with ether. The ethereal layer is washed with saturated brine solution and dried (MgSO$_4$). The clear ether solution (containing free base) is acidified with isopropanolic·HCl. The resulting white precipitate is recrystallized from 250 ml. of methanol to obtain 5.2 g. of white needles, identified to be product, M.P. 283–288° C.;

$\lambda_{max}^{KBr}$: 3.20, 3.48, 3.85, 4.00, 6.15$\mu$

Analysis.—Found (percent): C, 66.97; H, 8.43; N, 2.66; S, 12.57; Cl, 6.67. C$_{29}$H$_{43}$NOS$_2$·HCl requires (percent): C, 66.69; H, 8.49; N, 2.68; S, 12.28; Cl, 6.79.

EXAMPLE 7 dl - 4 - chloro - 17α - (3 - dimethylamino - 1 - propynyl)- 13 - ethyl - 17 - hydroxygon - 4 - en - 3 - one, cyclic ethylene thioketal and hydrochloride (a) dl - 4 - chloro - 13 - ethyl - 17α - ethynyl - 17 - hydroxygon-4-en-3-one, cyclic ethylene thioketal.—To a solution of 3.0 g. of dl-4-chloro-13-ethyl-17α-ethynyl-17-hydroxygon-4-en-3-one in 68 ml. of methanol is added 1.5 ml. of boron fluoride ethyl ether and 1.5 ml. of ethanedithiol. The solution is stirred for 30 minutes at 25° C. On cooling the mixture, the product crystallizes. The crystals are collected and washed with cold methanol to obtain 1.9 g. of compound, M.P. 180–183° C., $\lambda_{max}^{KBr}$: 2.95, 3.10, 3.48, 6.20, 6.95$\mu$ Analysis.—Found (percent): C, 64.96; H, 7.45; S, 15.27; Cl, 8.57. C$_{23}$H$_{31}$OClS$_2$ requires (percent): C, 65.30; H, 7.39; S, 15.16; Cl, 8.38.

(b) dl - 4 - chloro - 17α - (3 - dimethylamino - 1 - propynyl) - 13 - ethyl - 17 - hydroxygon - 4 - en - 3 - one, cyclic ethylene thioketal and hydrochloride.—To a solution of 1.5 g. of dl-4-chloro-13-ethyl-17α-ethynyl-17-hydroxygon-4-en-3-one, cyclic ethylene thioketal in 11 ml. of dioxane is added 0.8 ml. of water, 0.5 ml. of 40% formalin solution, 0.8 ml. of acetic acid, 0.18 g. of dimethylamine, and 50 mg. cuprous chloride. The mixture is stirred and heated to 70° C. under nitrogen for 20 hours. The reaction mixture is then poured into ice water and basified with 10% NaOH solution. The resulting precipitate is extracted with chloroform and the combined extracts are washed with saturated brine solution and dried (Na$_2$SO$_4$). The clear chloroform solution (containing free base) is evaporated to a small volume, acidified with isopropanolic HCl, and diluted with ether to give a solid hydrochloride salt. Three recrystallizations from methanol-ether afford 0.39 g. of product; M.P. 252° C., dec, $\lambda_{max}^{KBr}$: 3.10, 3.48, 3.93, 6.20, 6.85$\mu$ Analysis.—Found (percent): C, 58.48; H, 7.44; N, 2.73; S, 12.47; Cl, 13.54. C$_{26}$H$_{38}$NOS$_2$Cl·HCl·H$_2$O requires (percent): C, 58.41; H, 7.73; N, 2.62; S, 12.00; Cl, 13.26.

EXAMPLE 8 dl - 4 - chloro - 17α - (3 - diethylamino - 1 - propynyl) - 13 - ethyl - 17 - hydroxygon - 4 - en - 3 - one, cyclic ethylene thioketal and hydrochloride To a solution of 1.25 g. of dl-4-chloro-13-ethyl-17α-ethynyl-17-hydroxygon-4-en-3-one, cyclic ethylene thioketal in 11 ml. of dioxane is added 0.8 ml. of water, 0.5 ml. of 40% formalin solution, 0.8 ml. of acetic acid, 0.35 ml. of diethylamine and 50 mg. of cuprous chloride. The mixture is stirred and heated to 70° C. under nitrogen for 24 hours, then poured into ice-water and basified with 10% NaOH solution. The resulting precipitate is extracted with chloroform and the combined extracts are washed with saturated brine solution and dried (Na$_2$SO$_4$). The organic layer (containing free base) is evaporated to a small volume and acidified with isopropanolic·HCl. Addition of ether causes the product to precipitate as a white solid. Reprecipitation from methanol-ether affords 0.73 g. of compound, M.P. 245–350° C. dec, $\lambda_{max}^{KBr}$: 3.15, 3.50, 3.95, 6.22, 6.86$\mu$ Analysis.—Found (percent): C, 60.99; H, 7.77; N, 2.68; S, 11.50; Cl, 13.29. C$_{28}$H$_{42}$NOS$_2$Cl·HCl·½H$_2$O requires (percent): C, 60.74; H, 8.01; N, 2.53; S, 11.58; Cl, 12.81.

EXAMPLE 9 dl-4-chloro-17α-[3-(4-methyl-1-piperazinyl)-1 - propynyl] 13-ethyl-17-hydroxygon-4-en-3-one, cyclic ethylene thioketal and dihydrochloride To a solution of 1.1 g. of dl-4-chloro-13-ethyl-17α-ethynyl-17-hydroxygon-4-en-3-one, cyclic ethylene thioketal in 10 ml. of tetrahydrofuran is added 0.65 ml. of water, 0.4 ml. of 40% formalin solution, 0.65 ml. of acetic acid. 0.35 ml. of N-methyl-piperazine, and 50 mg. of cuprous chloride. The mixture is heated to 60° C. with stirring overnight under nitrogen. The reaction mixture is poured into ice-water and basified with 10% sodium hydroxide solution. The resulting precipitate is extracted with ether, and the combined extracts are washed with saturated brine solution and dried (MgSO$_4$) and filtered. The free base-containing filtrate is acidified with isopropanolic HCl. The resulting precipitate is collected and washed with ether and dried over P$_2$O$_5$ at 100° C. and 0.5 mm. vacuum to obtain 0.36 g. of product, M.P. 239–242° C., dec, $\lambda_{max}^{KBr}$: 3.00, 3.47, 4.20, 6.20, 6.92$\mu$.

Analysis.—Found (percent): C, 56.72; H, 7.57; N, 4.35; S, 10.21; Cl, 16.70. C$_{29}$H$_{43}$OClN$_2$S$_2$·2HCl requires (percent): C, 57.27; H, 7.46; N, 4.61; S, 10.54; Cl, 17.49.

EXAMPLE 10 dl-1-[3-(13-ethyl-17β-hydroxy - 3 - oxogon-4-en-17-yl)-2-propynyl] isonipecotic acid, cyclic ethylene thioketal and its Hydrochloride A solution of 6.0 g. of dl-13-ethyl-17α-ethynyl-17-hydroxygon-4-en-3-one, 3.9 ml. of acetic acid, 3.9 ml. of water, 2.4 ml. of 40% formalin, and 5.4 g. of isonipecotic acid in 70 ml. of dioxane with 150 mg. cuprous chloride is heated to 80° C. with stirring under nitrogen. The reaction mixture is added to ice water, and the resulting solid is filtered off and dried. The material is dissolved in 600 ml. of hot methanol and filtered to obtain a clear solution and the solution is evaporated to a small volume. Acidification of the solution with 4 N isopropanolic HCl causes the product to precipitate, and it is further diluted with ether and the crystalline material collected by filtration to obtain 4.9 g. of the title compound, M.P. 262–265° C. dec.

Analysis.—Found (percent): C, 63.64; H, 7.97; N, 2.41; S, 11.56; Cl, 6.42. C$_{30}$H$_{43}$NO$_3$S$_2$·HCl requires (percent): C, 63.63; H, 7.83; N, 2.47; S, 11.33; Cl, 6.26.

EXAMPLE 11

The procedure of Example 1 is repeated, substituting for dimethylamine appropriately-substituted secondary amines and the following 17α-aminoalkynyl-13-ethyl-17-hydroxygon-4-en-3-one, cyclic ethylene thioketals are obtained:

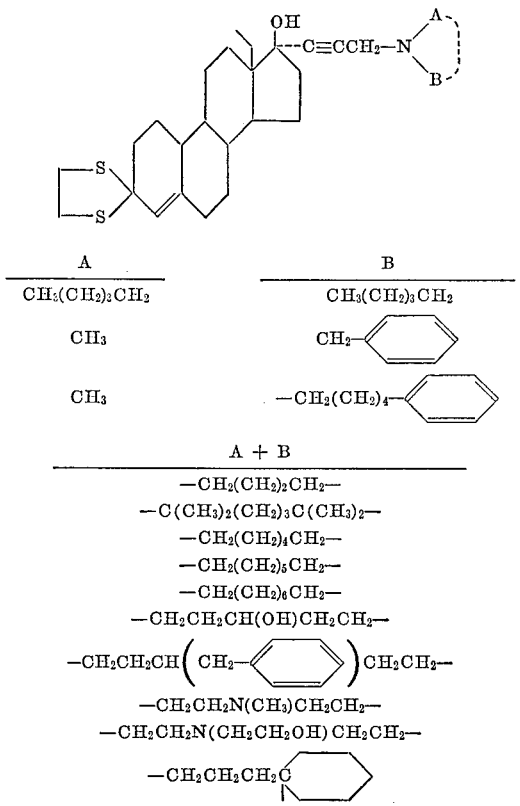

| A | B |
|---|---|
| CH₃(CH₂)₃CH₂ | CH₃(CH₂)₃CH₂ |
| CH₃ | CH₂–⌬ |
| CH₃ | –CH₂(CH₂)₄–⌬ |

| A + B |
|---|
| –CH₂(CH₂)₂CH₂– |
| –C(CH₃)₂(CH₂)₃C(CH₃)₂– |
| –CH₂(CH₂)₄CH₂– |
| –CH₂(CH₂)₅CH₂– |
| –CH₂(CH₂)₆CH₂– |
| –CH₂CH₂CH(OH)CH₂CH₂– |
| –CH₂CH₂CH(CH₂–⌬)CH₂CH₂– |
| –CH₂CH₂N(CH₃)CH₂CH₂– |
| –CH₂CH₂N(CH₂CH₂OH)CH₂CH₂– |
| –CH₂CH₂CH₂O– (ring) |

EXAMPLE 12

The procedure of Example 1 is repeated, substituting for the dl-13-ethyl-17α-ethynyl-17-hydroxygon-4-en-3-one, cyclic ethylene thioketal, appropriately substituted 13-alkyl-17α-ethynyl-17-hydroxygon-4-en-3-one, cyclic ethylene thioketals or alkanoates and the 17-hydroxygon-4-en-3-one, cyclic ethylene thioketals and alkonoates are obtained:

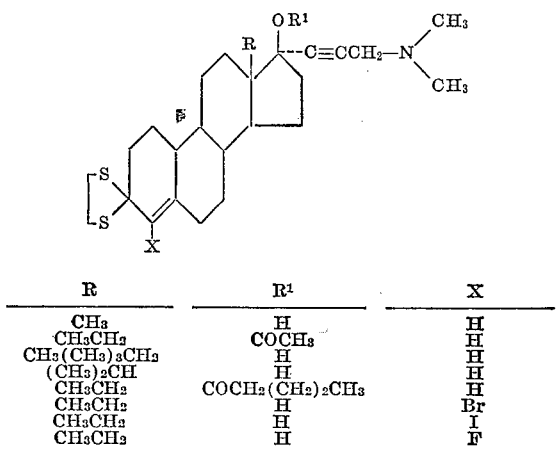

| R | R¹ | X |
|---|---|---|
| CH₃ | H | H |
| CH₃CH₂ | COCH₃ | H |
| CH₃(CH₂)₃CH₂ | H | H |
| (CH₃)₂CH | H | H |
| CH₃CH₂ | COCH₂(CH₂)₂CH₃ | H |
| CH₃CH₂ | H | Br |
| CH₃CH₂ | H | I |
| CH₃CH₂ | H | F |

EXAMPLE 13

The sulfuric, nitric, phosphoric, acetic, malic, citric, aconitic and pamoic acid addition salts of 17α(3-dimethylamino-1-propynyl)-13-ethyl-17-hydroxygon-4-ene-3-one, cyclic ethylene thioketal (Example 1) are prepared by treating the clear ether filtrate containing the basic form of the product with stoichiometric amounts of the respective acids in isopropanol, then evaporating the solvents, leaving the addition salt as a residue.

EXAMPLE 14

$l$-17α - (3 - diethylamino-1-propynyl) - 13 - ethyl-17-hydroxygon-4-ene-3-one, cyclic ethylene thioketal and hydrochloride (a) $l$ - 13 - ethyl - 17α-ethynyl-17-hydroxygon-4-en-3-one, cyclic ethylene thioketal.—To a solution of 20 g. of $l$-13-ethyl-17α-ethynyl-17-hydroxygon-4-en-3-one in 450 ml. of methanol is added 10 ml. of boron-trifluoride etherate and 10 ml. of ethanedithiol. The solution is stirred for 30 minutes at 25° C., then added to an equal volume of water. The mixture is extracted with chloroform, and the organic extracts are washed with 10% sodium hydroxide solution, saturated brine solution and dried over sodium sulfate. The clear chloroform solution is evaporated by boiling. Methanol is added and the solution is evaporated until only 200 ml. of methanol solvent remains. The solution is cooled to +10° C. for 24 hours, and the resulting crystalline material is collected by filtration and dried over phosphorus pentoxide in vacuo to obtain 10 g. of title compound; M.P. 144–146° C., $[\alpha]_D^{24}$: −38° C. (c.=1.0% CHCl₃).

*Analysis.*—Found (percent): C, 70.80; H, 8.00; S, 16.39. C₂₃H₃₂OS₂ requires (percent): C, 71.10; H, 8.30; S, 16.47.

(b) $l$-17α-(3-diethylamino - 1 - propynyl) - 13 - ethyl-17-hydroxygon-4-en-3-one, cyclic ethylene thioketal and hydrochloride.—To a solution of 6.0 g. of $l$-13-ethyl-17α-ethynyl-17-hydroxygon-4-en-3-one, cyclic ethylene thioketal in 56 ml. of dioxane is added 4.0 ml. of water, 2.0 ml. of 40% formalin solution, 4.0 ml. of acetic acid, and 1.6 ml. of diethylamine with 120 mg. of cuprous chloride. The solution is stirred and heated to 75° C. for 24 hours under nitrogen. After adding the reaction mixture to ice water and basifying with 10% sodium hydroxide solution the resulting precipitate is extracted with ether. The ether extracts are washed with saturated brine solution and dried over MgSO₄. The clear ether solution is acidified with 4 N isopropanolic HCl, and the resulting precipitate is collected by filtering to obtain 5.0 g. of material. Reprecipitation from methanol-ether affords 3.8 g. of product, M.P. 252–255° C. with decomposition, $[\alpha]_D^{24}$: −16° (c.=1.1% CHCl₃).

*Analysis.*—Found (percent): C, 65.66; H, 8.39; N, 2.99; S, 12.83; Cl, 7.24. C₂₈H₄₃NOS₂·HCl requires (percent): C, 65.91; H, 8.69; N, 2.75; S, 12.57; Cl, 6.95.

We claim:
1. A compound selected from those of the formula

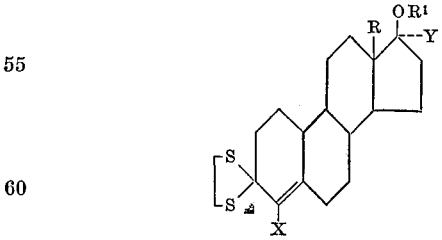

wherein:
R is alkyl of from 1 to 5 carbon atoms;
R¹ is hydrogen or alkanoyl of from 2 to 5 carbon atoms;
X is hydrogen or halo; and
Y is

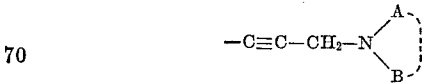

wherein A and B, independently, are alkyl of from 1 to 5 carbon atoms, monophenyl-substituted alkyl of from 1 to 5 carbon atoms or, taken together, form a divalent radical selected from

—C(R³)₂(CH₂)ₘC(R³)₂—

R³ being hydrogen or methyl and m a whole number of from 2 to 6,

—CH₂CH₂CH(R⁴)CH₂CH₂—

R⁴ being hydroxy, carboxy or monophenyl-substituted alkyl of from 1 to 5 carbon atoms,

—CH₂CH₂N(R⁵)CH₂CH₂—

R⁵ being selected from alkyl of from 1 to 5 carbon atoms or monohydroxy-substituted alkyl of from 1 to 5 carbon atoms,

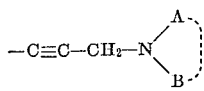

or

—CH₂CH₂OCH₂CH₂— and non-toxic, acid-addition salts thereof.

2. A compound as defined in claim 1 wherein R is methyl or ethyl, R¹ is hydrogen, X is hydrogen or chloro and Y is

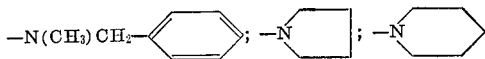

wherein

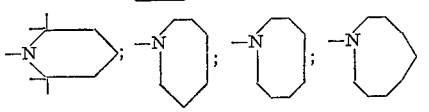

is —N(CH₃)₂; —N(CH₂CH₃)₂; —N(CH₂CH₂CH₃)₂;

3. A compound as defined in claim 1 which is 17α-(3-dimethylamino - 1 - propynyl)-13-ethyl-17-hydroxygon-4-en-3-one, cyclic ethylene thioketal.

4. A compound as defined in claim 3 in the form of a hydrochloric acid addition salt, monohydrate.

5. A compound as defined in claim 1 which is 17α-(3-diethylamino - 1 - propynyl)-13-ethyl-17-hydroxygon-4-en-3-one, cyclic ethylene thioketal.

6. A compound as defined in claim 5 in the form of a hydrochloric acid addition salt.

7. A compound as defined in claim 1 which is 17α-(3-dipropylamino - 1 - proylnyl)-13-ethyl-17-hydroxygon-4-en-3-one, cyclic ethylene thioketal.

8. A compound as defined in claim 1 which is 17α-(3-dibutylamino - 1 - propynyl)-13-ethyl-17-hydroxygon - 3-en-3-one, cyclic ethylene thioketal.

9. A compound as defined in claim 8 in the form of a hydrochloric acid addition salt.

10. A compound as defined in claim 1 which is 17α-(3-morpholine - 1 - propynyl)-13-ethyl-17-hydroxygon-4-en-3-one, cyclic ethylene thioketal.

11. A compound as defined in claim 10 in the form of a hydrochloric acid addition salt, monohydrate.

12. A compound as defined in claim 1 which is 13-ethyl - 17β - hydroxy-17-(3-piperidino-1-propynyl)gon-4-en-3-one, cyclic ethylene thioketal.

13. A compound as defined in claim 12 in the form of a hydrochloric acid addition salt.

14. A compound as defined in claim 1 which is 4-chloro - 17α - (3-dimethylamino - 1 - propynyl)-13-ethyl-17-hydroxygon-4-en-3-one, cyclic ethylene thioketal.

15. A compound as defined in claim 14 in the form of a hydrochloric acid addition salt.

16. A compound as defined in claim 1 which is 4-chloro-17α - (3-diethylamino - 1 - propynyl)-13-ethyl-17-hydroxygon-4-en-3-one, cyclic ethylene thioketal.

17. A compound as defined in claim 16 in the form of a hydrochloric acid addition salt.

18. A compound as defined in claim 1 which is 4-chloro - 17α-((3-(4-methyl-1-piperazinyl)-1-propynyl))-13-17-hydroxygon-4-en-3-one, cyclic ethylene thioketal.

19. A compound as defined in claim 18 in the form of a dihydrochloric acid addition salt.

20. A compound as defined in claim 1 which is 1-[3-13 - ethyl - 17β - hydroxy - 3 - oxogon-4-en-17-yl)-2-propynyl]isonipecotic acid, cyclic ethylene thioketal.

21. A compound as defined in claim 20 in a form of a hydrochloric acid addition salt.

22. A compound as defined in claim 5 in the form of an l-enantiomer, substantially free of the d-enantiomer.

23. A compound as defined in claim 22 in the form of a hydrochloric acid addition salt.

No references cited.

HENRY A. FRENCH, Primary Examiner

U.S. Cl. X.R.
260—239.55, 999